(12) United States Patent
Kakegawa et al.

(10) Patent No.: US 9,886,649 B2
(45) Date of Patent: Feb. 6, 2018

(54) OBJECT DETECTION DEVICE AND VEHICLE USING SAME

(71) Applicant: Hitachi Automotive Systems, Ltd., Hitachinaka-shi, Ibaraki (JP)

(72) Inventors: Shinji Kakegawa, Tokyo (JP); Haruki Matono, Tokyo (JP); Yuji Otsuka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/026,713

(22) PCT Filed: Sep. 29, 2014

(86) PCT No.: PCT/JP2014/075771
§ 371 (c)(1),
(2) Date: Apr. 1, 2016

(87) PCT Pub. No.: WO2015/053100
PCT Pub. Date: Apr. 16, 2015

(65) Prior Publication Data
US 2016/0253575 A1    Sep. 1, 2016

(30) Foreign Application Priority Data
Oct. 7, 2013    (JP) .................... 2013-209796

(51) Int. Cl.
*B60T 7/22* (2006.01)
*G08G 1/16* (2006.01)
(Continued)

(52) U.S. Cl.
CPC .............. *G06K 9/6212* (2013.01); *B60T 7/22* (2013.01); *G06K 9/00208* (2013.01);
(Continued)

(58) Field of Classification Search
None
See application file for complete search history.

(56) References Cited

U.S. PATENT DOCUMENTS 6,118,475 A * 9/2000 Iijima ................. G01C 11/06
348/42
6,813,370 B1 * 11/2004 Arai .................. G06T 7/593
340/908.1
(Continued)

FOREIGN PATENT DOCUMENTS

EP    2 323 098 A1    5/2011
EP    2 741 233 A2    6/2014
(Continued)

OTHER PUBLICATIONS

International Search Report (PCT/ISA/210) issued in PCT Application No. PCT/JP2014/075771 dated Dec. 22, 2014 with English translation (five pages).
(Continued)

*Primary Examiner* — Thomas G Black
*Assistant Examiner* — Demetra R Smith-Stewart
(74) *Attorney, Agent, or Firm* — Crowell & Moring LLP

(57) ABSTRACT

Provided is an object detection device that makes it possible to more accurately detect a road surface even when an area that is not the road surface occupies the majority of an image and the gradient of the road surface is large, and to detect an obstacle on a road surface with greater accuracy than in the prior art. The object detection device includes: a parallax calculation unit that generates a parallax image on the basis of a plurality of images; a parallax gradient calculation unit that, for each pixel in the parallax image, calculates a parallax gradient for each pixel on the basis of the parallax of a predetermined pixel and a pixel that is adjacent to the predetermined pixel; a detection candidate determination unit that determines whether a detection candidate is present
(Continued)

on the basis of the parallax gradient of each pixel; a voting unit that carries out a histogram vote using each of the pixels that are determined to be detection candidates and generates a histogram frequency for each of the pixels when the detection candidate is determined to be present; and an object detection unit that detects presence of an object and a position of the object on the basis of the histogram frequency.

8 Claims, 6 Drawing Sheets

(51) Int. Cl.
　　 G06K 9/62　　　　(2006.01)
　　 G06K 9/00　　　　(2006.01)
　　 G06T 7/593　　　　(2017.01)
(52) U.S. Cl.
　　 CPC ..... *G06K 9/00791* (2013.01); *G06K 9/00798* (2013.01); *G06K 9/00805* (2013.01); *G06T 7/593* (2017.01); *G08G 1/165* (2013.01); *G08G 1/166* (2013.01); *G06T 2207/30256* (2013.01)

(56) References Cited

U.S. PATENT DOCUMENTS

| | | | | |
|---|---|---|---|---|
| 6,985,619 B1* | 1/2006 | Seta | ................... | G06K 9/00798 345/419 |
| 8,139,821 B2* | 3/2012 | Aimura | ................. | G01C 3/085 382/104 |
| 8,224,031 B2* | 7/2012 | Saito | ................. | G06K 9/00798 348/187 |
| 8,229,173 B2* | 7/2012 | Kawakami | .............. | G06T 7/285 382/107 |
| 8,917,929 B2* | 12/2014 | Ichimori | ................ | G01C 11/06 345/419 |
| 8,965,052 B2* | 2/2015 | Guan | ................. | G06K 9/00791 348/169 |
| 9,299,153 B2* | 3/2016 | Aoki | .................... | G01B 11/026 |
| 2003/0227378 A1* | 12/2003 | Nakai | ................... | G06T 7/0022 340/435 |
| 2004/0096082 A1 | 5/2004 | Nakai et al. | | |
| 2011/0234761 A1* | 9/2011 | Yumiba | ..................... | B60R 1/00 348/46 |
| 2012/0069181 A1* | 3/2012 | Xue | ....................... | G01J 3/0229 348/148 |
| 2012/0294482 A1* | 11/2012 | Kasaoki | ............. | G06K 9/00791 382/103 |
| 2013/0083971 A1* | 4/2013 | Du | ...................... | G06K 9/00825 382/104 |
| 2013/0147797 A1* | 6/2013 | Tanaka | ................. | H04N 13/026 345/419 |

FOREIGN PATENT DOCUMENTS

| | | |
|---|---|---|
| JP | 2004-86779 A | 3/2004 |
| JP | 2011-128844 A | 6/2011 |
| JP | 2013-114476 A | 6/2013 |
| JP | 2013-161190 A | 8/2013 |
| JP | 2014-110059 A | 6/2014 |

OTHER PUBLICATIONS

Japanese-language Written Opinion (PCT/ISA/237) issued in PCT Application No. PCT/JP2014/075771 dated Dec. 22, 2014 (three pages).

Wedel et al., "B-Spline Modeling of Road Surfaces With an Application to Free-Space Estimation", IEEE Transactions on Intelligent Transportation Systems, Dec. 2009, pp. 572-583, vol. 10, No. 4.

R. Einramhof et al., "Stereo-based Real-time Scene Segmentation for a Home Robot," 52nd International Symposium ELMAR-2010, Sep. 15-17, 2010, pp. 455-458, IEEE, Piscataway, NJ, USA, XP031778086.

Y. Gao et al., "U-V-Disparity based Obstacle Detection with 3D Camera and Steerable Filter," Intelligent Vehicles Symposium (IV), Jun. 5-9, 2011, pp. 957-962, IEEE, Baden-Baden Germany, XP031998935.

Extended European Search Report issued in counterpart European Application No. 14853117.1 dated Apr. 26, 2017 (seven (7) pages).

* cited by examiner

FIG. 2
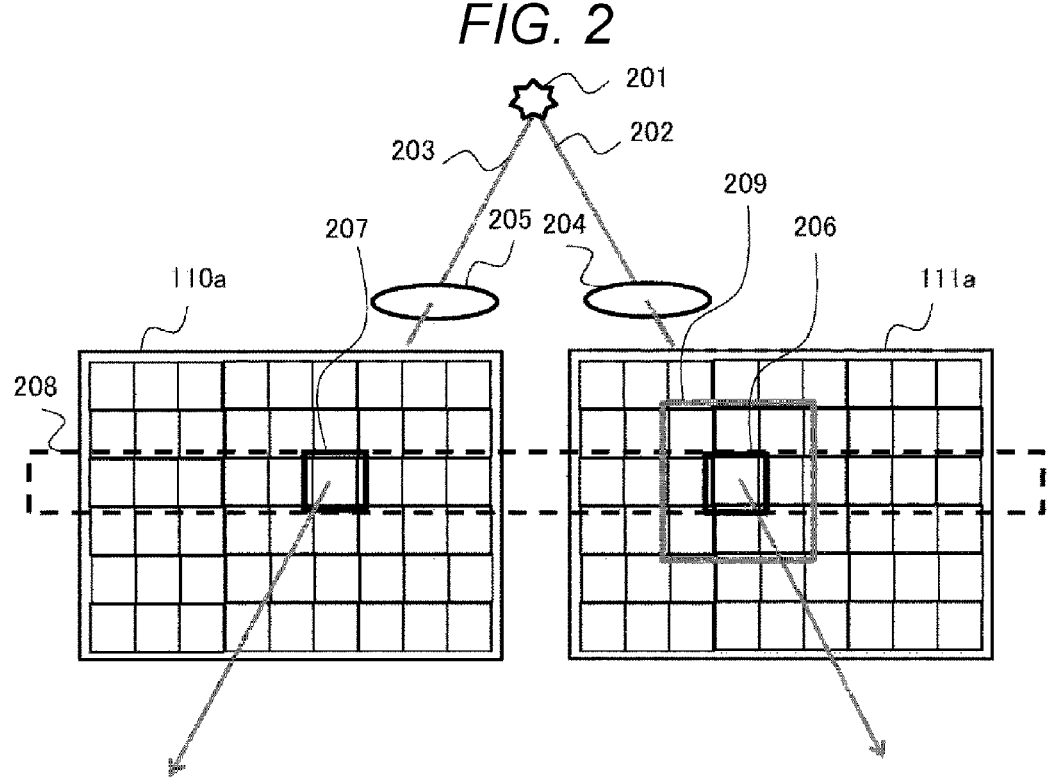
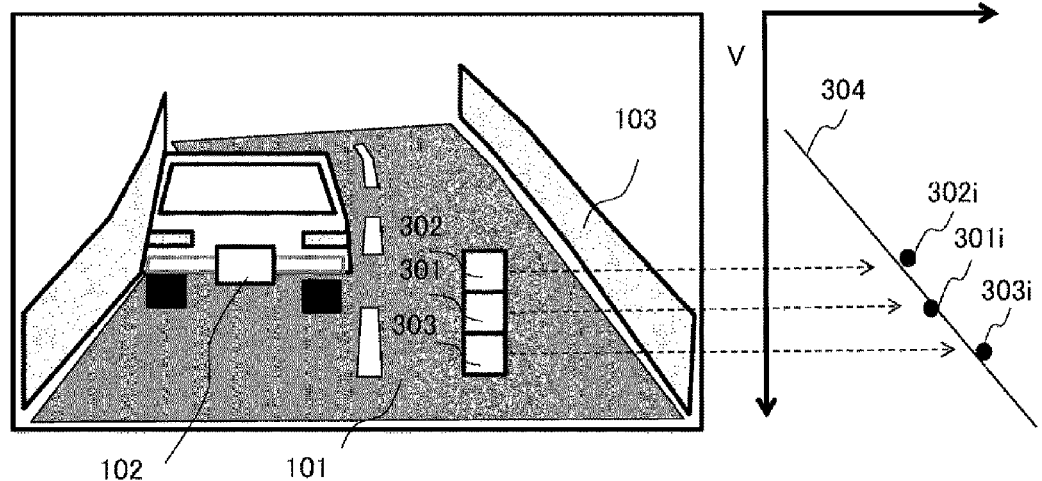
FIG. 3A
FIG. 3B

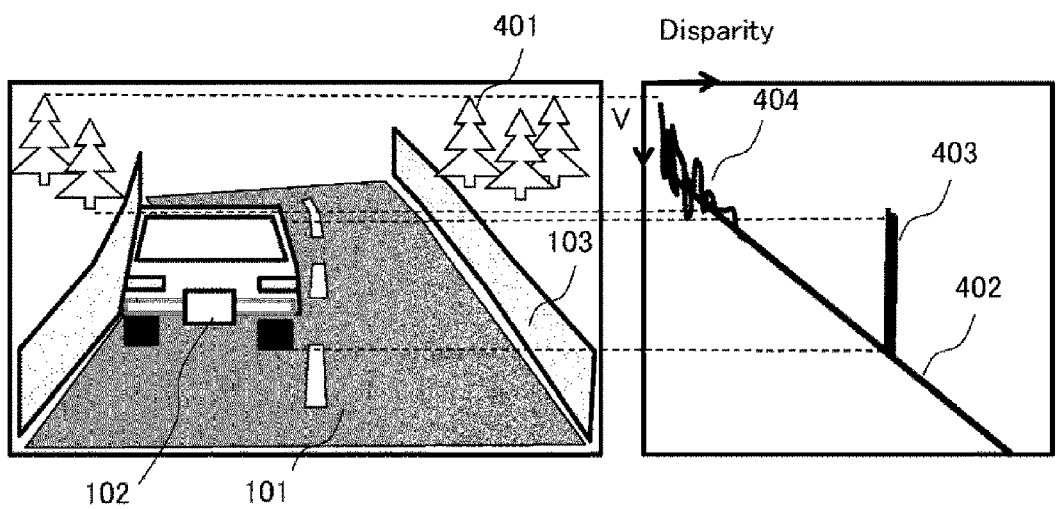
FIG. 4A
FIG. 4B1
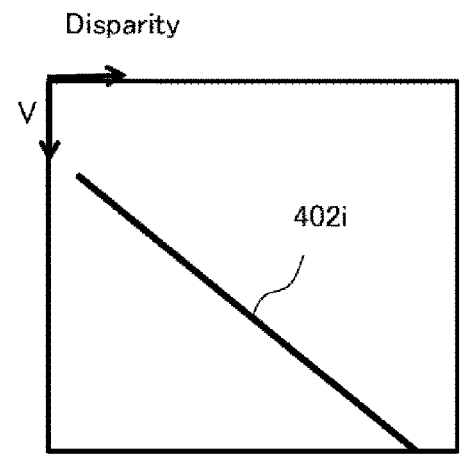
FIG. 4B2

OBJECT DETECTION DEVICE AND VEHICLE USING SAME

TECHNICAL FIELD

The present invention relates to an object detection device to detect an object and a vehicle using the same.

BACKGROUND ART

Recently, object detection devices including a stereo camera device, a laser radar device and the like, which detect an ambient object by processing distance information acquired by sensing the external, have been put into practical use. These object detection devices can be applied to a monitoring system to detect intrusion of a suspicious person, an abnormality, an in-vehicle system to support driving safety of a car, or the like.

An object at the front side which hinders driving is regarded as an obstacle, and it is possible to provide a function to avoid or alleviate collision using a means such as alarm or automatic braking in a case where there is a risk of collision with the obstacle in the in-vehicle system.

It is important to estimate a geometric position relationship of a road surface in order to accurately detect the obstacle and a position of the obstacle in the in-vehicle system. The road surface is almost reliably included in a sensing range in the environment of the in-vehicle system, which is because it is possible to narrow down an area in which the obstacle is present, for example, to regard an object detected on the road as the obstacle when it is possible to calculate the geometric position of the road surface. It is possible to reduce problems such as erroneous detection in which an obstacle is erroneously detected in a spatial area in which the obstacle is absent or non-detection in which an obstacle is not detected in a spatial area in which the obstacle is present by narrowing down an area in which the obstacle is present. Thus, it is important to accurately detect the road surface in order to accurately detect the obstacle.

PTL 1 is an example of the background art in the present technical field. PTL 1 discloses a technique of providing a road surface shape recognition device which is capable of accurately detecting an actual road surface shape not only in a case where a traffic lane is marked on a road surface but also in a case where the traffic lane is not marked. In addition, NPL 1 describes that "the computation of the free space computation has two main goals: 1. Find the distances to the closest objects. 2. Find the road surface segmentation. While finding the distance to objects aims at navigating the car or triggering safety systems, the second objective is probably of the same importance. It is crucial for the road surface estimation task described in the first part of this paper. The reason for this is that measurements on vehicles and other objects in crowded scenarios influence the B-spline curve and the resulting curve estimation may become unstable in such scenarios. Therefore, only 3D measurements in the free space are used for the spline estimation, neglecting all stereo measurements on objects", and "how is the correct free space boundary found. The key idea is to inspect every individual image column u. A matching score is obtained, summing up a score which evaluates the likelihood of pixels belonging to the road surface from the bottom of the image up to the free space boundary v(d,u). A second matching score evaluates the fit of pixels belonging to objects with disparity d from the free space boundary in the image on upwards. The total score for an image row u and an obstacle at disparity d becomes: SCORE(u,d)=ROAD(u,d)+OBJECT(u,d). The best boundary match is given as the maximal score".

CITATION LIST

Patent Literature

PTL 1: JP 2011-128844 A

Non-Patent Literature

NPL 1: 'B-Spline Modeling of Road Surfaces with an Application to Free Space Estimation', page 428, Andreas Wedel, et al., pp 572, IEEE Transactions on ITS, 2009

SUMMARY OF INVENTION

Technical Problem

PTL 1 describes a stereo camera device which detects a road surface by processing a distance image calculated using a stereo camera. However, there is room for improvement in the stereo camera device described in PTL 1 because it is difficult to accurately detect the road surface in a case where an area that is not the road surface, for example, an area in which an obstacle such as a vehicle, a pedestrian or a guardrail is imaged occupies the majority of the image.

PTL 2 describes a method of detecting an obstacle candidate area in advance, regarding an area that is not the obstacle candidate area as a road surface candidate, and estimating a road surface only using distance data of the road surface candidate, which reduces an adverse effect of the distance data of the obstacle on the road surface estimation.

However, the method described in PTL 2 has a problem that the road surface is not accurately detected since it is difficult to determine whether the road surface is present or the obstacle is present in a case where a gradient of the road surface is large, a case where the back of the obstacle is not perpendicular but inclined with respect to the line of sight to measure a distance, a case where the obstacle is distant, or the case of an area in which the road surface is imaged, and it is difficult to accurately extract the distance data of the road surface candidate.

Thus, an object of the present invention is to provide an object detection device that makes it possible to more accurately detect a road surface in a case where an area that is not the road surface occupies the majority of an image, but also in a case where a gradient of the road surface is large, a case where the back of the obstacle is not perpendicular but inclined with respect to the line of sight to measure a distance, a case where the obstacle is distant, or the case of an area in which a distant road surface is imaged, and to detect an obstacle on a road surface with greater accuracy than in the prior art.

Solution to Problem

In order to solve the above-described problems, the object detection device according to the present invention is configured to include: a parallax calculation unit that generates a parallax image on the basis of a plurality of images; a parallax gradient calculation unit that, for each pixel in the parallax image, calculates a parallax gradient for each pixel on the basis of the parallax of a predetermined pixel and a pixel that is adjacent to the predetermined pixel; a detection candidate determination unit that determines whether a detection candidate is present on the basis of the parallax gradient of each pixel; a voting unit that carries out a histogram vote using each of the pixels that are determined to be detection candidates and generates a histogram frequency for each of the pixels when the detection candidate is determined to be present; and an object detection unit that detects the presence of an object and a position of the object on the basis of the histogram frequency.

Advantageous Effects of Invention

According to the present invention, it is possible to accurately detect a road surface not only in a case where an area that is not the road surface, for example, an obstacle such as a vehicle, a pedestrian or a guardrail, occupies the majority of the image, but also in a case where a gradient of the road surface is large or a case where the obstacle is not perpendicular but has a gradient with respect to the road surface, and thus, it is possible to accurately detect the obstacle on the road surface.

BRIEF DESCRIPTION OF DRAWINGS

FIG. 2 is a diagram that describes a process in a parallax calculation unit of the object detection device according to the present invention.

FIGS. 3A and 3B are diagrams that describe a process in a parallax gradient calculation unit of the object detection device according to the present invention.

FIGS. 4A to 4B2 are diagrams that describe a process in a V-disparity image generation unit of the object detection device according to the present invention.

DESCRIPTION OF EMBODIMENTS

Next, the present embodiment will be described with reference to the drawings hereinafter.

A description will be given in the present embodiment regarding a case where the present invention is applied to a system that detects an object such as a road surface or an obstacle on a front side of a host vehicle using a video of a stereo camera device which is an object detection device mounted to the host vehicle.

Figure 1:
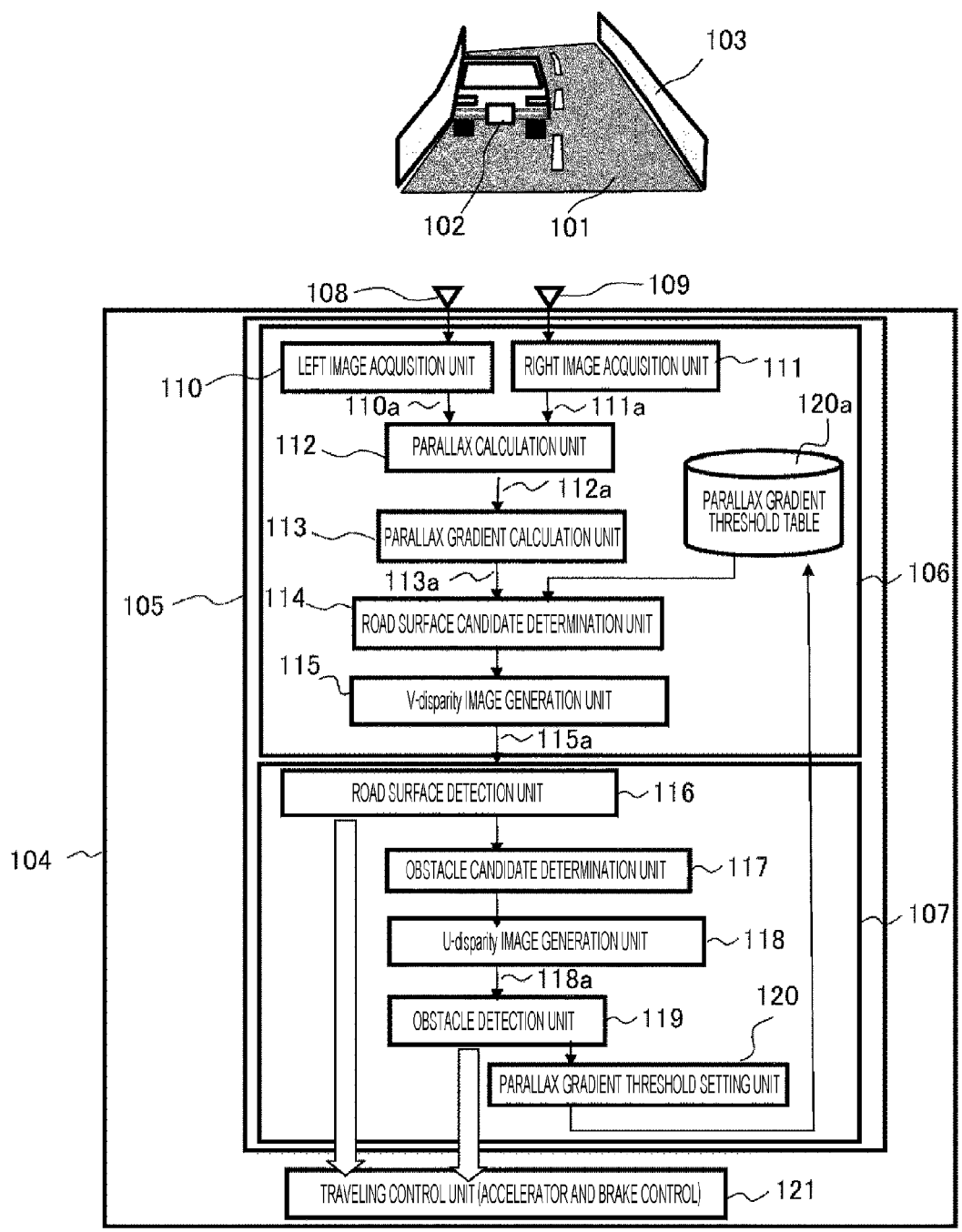
FIG. 1 is a system overview view illustrating an embodiment of an object detection device according to the present invention.

First, an overview of the present system will be described with reference to FIG. 1. In FIG. 1, reference numeral 105 indicates a stereo camera device mounted to a vehicle 104. The stereo camera device 105 detects the presence of a road surface 101 on a front side of the vehicle (host vehicle) 104 and a position thereof through image processing, and detects the presence of an obstacle, for example, a preceding vehicle 102 or a guardrail 103, which is on a front side of the vehicle 104 and a position thereof.

The stereo camera device 105 is provided with a left imaging unit (left camera) 108 and a right imaging unit (right camera) 109 as a pair of imaging means that images a front side of the vehicle 104, and is configured of a processing configuration 106 according to hardware for processing of a signal from the imaging means and a processing configuration 107 according to software.

Each of the left imaging unit 108 and the right imaging unit 109 includes an imaging element such as a CCD to convert light into a charge signal, and is arranged in the vehicle 104 so as to image the front side of the vehicle from positions spaced apart from each other in a vehicle width direction. The charge signal is input for each constant period from the left imaging unit 108 to a left image acquisition unit 110 to output a left image 110a, and the charge signal is input from the right imaging unit 109 to a right image acquisition unit 111 at a timing in synchronization with the constant period to output a right image 111a.

A parallax calculation unit 112 calculates parallax for each pixel of the right image 11a by collating the left image 110a and the right image 111a, and outputs a parallax image 112a in which the parallax is stored for each pixel.

A parallax gradient calculation unit 113 calculates a parallax gradient of the pixel for each pixel of the parallax image 112a using the parallax of the pixel and each parallax of upper and lower pixels adjacent to the pixel.

A road surface candidate determination unit 114 compares the parallax gradient of the pixel and a parallax gradient threshold corresponding to the parallax of the pixel acquired from a parallax gradient threshold table 120a for each pixel of the parallax image 112a, and determines whether a data point of the pixel (indicating a point on a three-dimensional space which is represented by an image coordinate of a pixel and the parallax stored in the pixel) is a road surface candidate.

A V-disparity image generation unit 115 performs a histogram vote process using the data point which is determined that the road surface candidate is present among the respective pixels of the parallax image 112a, and generates a V-disparity image 115a which is a two-dimensional image having an image coordinate in the vertical direction and the parallax as coordinate axes, and in which a histogram frequency indicating the total votes at the data point is stored for each of the pixels.

The processing configuration 106 according to the hardware is provided as a circuit dedicated for image processing, and is configured such that a series of processes from the left image acquisition unit 110 and the right image acquisition unit 111 to the V-disparity image generation unit 115 are executed in parallel for each pixel.

A road surface detection unit 116 detects the presence of the road surface 101 on the front side of the vehicle 104 and a position thereof on the basis of the histogram frequency of the V-disparity image.

An obstacle candidate determination unit 117 compares a spatial position of the data point of the pixel and the road surface position detected by the road surface detection unit 116 for each pixel of the parallax image 112a, and determines whether the data point of the pixel is an obstacle candidate.

A U-disparity image generation unit 118 performs a histogram vote process using the data point determined to as the obstacle candidate among the respective pixels of the parallax image 112a, and generates a U-disparity image 118a which is a two-dimensional image having an image coordinate in the horizontal direction and the parallax as coordinate axes, and in which a histogram frequency indicating the total votes of the data point is stored for each pixel.

The obstacle detection unit 119 detects the presence of the obstacle, for example, the preceding vehicle 102, the guardrail 103, or the like, which is on the front side of the vehicle 104, and a position thereof on the basis of the histogram frequency of the U-disparity image.

A parallax gradient threshold setting unit 120 calculates the parallax gradient threshold, which is a threshold to determine whether the road surface is present for each parallax in a certain fixed range, and stores the parallax gradient threshold table 120a obtained by collecting the calculated thresholds in a table in a memory.

A traveling control unit 121 controls an accelerator, a braking, and the like of the vehicle 104 based on the road surface position detected by the road surface detection unit 116 and the obstacle position detected by the obstacle detection unit 119, and carries out driving control such as control to prevent the collision with the obstacle, for example, the preceding vehicle, the guardrail, or the like, control to follow the preceding vehicle, and control to travel on a sloping road or a road with undulation with low-fuel consumption.

Next, a process in the parallax calculation unit 112 will be described in detail with reference to FIG. 2. The parallax calculation unit 112 detects a pixel corresponding to the left image 110a for each pixel of the right image 111a, and performs a process of calculating parallax (a gap in the image position between corresponding pixels).

A description will be given in FIG. 2 regarding, for example, a process of calculating parallax of a pixel 206 through parallax calculation processing in a case where light 202 and 203 from a certain light source 201 passes through a lens 204 of the right camera and a lens 205 of the left camera, respectively, and forms images at positions on the imaging elements corresponding to the pixel 206 of the right image 111a and a pixel 207 of the left image 110a.

At this time, a pixel having the most proximate signal is detected as the corresponding pixel by comparing a signal of the pixel 206 and each signal of the pixels of the left image 110a on an epipolar line 208 in the parallax calculation processing of detecting the pixel 207 of the left image 110a corresponding to the pixel 206 of the right image 111a. Although various types of indexes are considered as an index to calculate a proximity of the signal, when an index of an AD (absolute difference), which is an absolute value of a difference between signal values of the right and left pixels, is used, for example, a pixel having the smallest AD on the epipolar line 208 is determined as the corresponding pixel. At this time, the parallax corresponding to the pixel 206, in a case where a result of calculating the correspondence seems to be right and the pixel 206 of the right image 111a and the pixel 207 of the left image 110a are regarded to correspond to each other, is calculated as a difference in the image coordinate in the horizontal direction between the pixel 206 and the pixel 207.

In the above-described manner, the parallax calculation unit 112 generates the parallax image 112a in which the parallax corresponding to each pixel of the right image 111a is stored by performing the process of calculating the parallax for all the pixels of the right image 111a.

The description has been given regarding the method of detecting the correspondence by comparing the signal values between the right and left pixels in the parallax calculation processing in the present embodiment, but the correspondence may be detected by comparing signal values of areas each of which includes a plurality of pixels, which is an effective method to carry out the matching process more stably and properly. In this case, for example, a signal of an area 209 having 3×3 pixels around the pixel 206 and a signal of an area having 3×3 pixels around each pixel of the left image 110a on the epipolar line 208 are compared, and a pixel having the most proximate signal is detected as the corresponding pixel. It is possible to calculate the proximity of the signal using an index of SAD (sum of absolute differences), for example.

Incidentally, the parallax calculation processor of the present embodiment is configured to output the parallax image 112a, and the road surface and the obstacle are detected by processing the parallax image 112a in various ways in the subsequent processes, but it is also possible to obtain the same effect in the processor which outputs a distance image in which a distance is stored for each pixel instead of the parallax image, and processes the distance image in various ways in the subsequent processes. It is possible to easily convert the parallax to the distance according to the principle of triangulation, and thus, the parallax is regarded as information equivalent to distance in the description of the present embodiment.

Accordingly, when the presence of the road surface and the obstacle is detected and the parallax in the corresponding area is acquired by the subsequent processors, it is considered that the geometric position relationship between the vehicle 104 and the corresponding road surface and obstacle is acquired.

Next, a process in the parallax gradient calculation unit 113 will be described in detail with reference to FIGS. 3(a) and 3(b).

The parallax gradient calculation unit 113 calculates a parallax gradient of a pixel using the parallax of the pixel and the parallax of the upper and lower pixels adjacent to the pixel for each pixel of the parallax image 112a. FIG. 3(a) illustrates pixels 301, 302 and 303 which relate to calculation of a parallax gradient of the pixel 301 on the right image 111a, and FIG. 3(b) illustrates points 301i, 302i and 303i, obtained by projecting the data points of the respective pixels on a V-disparity space having an image ordinate V and a parallax Disparity as axes, and a straight line 304 passing through the proximity of the three points which is calculated based on the positions of the three points. The parallax gradient calculation unit calculates the straight line 304 illustrated in FIG. 3 (b) according to a least-square method, calculates and outputs a gradient $\alpha i = \Delta Disparity / \Delta V$.

Next, a process in the road surface candidate determination unit 114 will be described in detail.

The road surface candidate determination unit 114 determines whether the data point of the pixel is the road surface candidate by comparing the parallax gradient $\alpha i$, calculated by the parallax gradient calculation unit 113, and a parallax gradient threshold $\alpha th(di)$ corresponding to the parallax di of the pixel acquired from the parallax gradient threshold table 120a, for each pixel of the parallax image 112a.

The determination criterion is just as illustrated in the following Table 1.

TABLE 1

| | |
|---|---|
| $\alpha i \geq \alpha th$ (di) | → Presence of road surface candidate |
| otherwise | → Absence of road surface candidate |

Next, a process in the V-disparity image generation unit 115 will be described in detail with reference to FIGS. 4(a) to 4(b2).

FIG. 4(a) illustrates a right image 109a, and the road surface 101, the preceding vehicle 102, the guardrail 103, and a tree 401 are reflected as main imaging targets in the right image 109a.

The V-disparity image generation unit 115 performs a process of histogram-voting the data point, determined as the road surface candidate in the road surface candidate determination unit 114 among the respective pixels of the parallax image 112a corresponding to the right image 109a, in the V-disparity image. Here, the V-disparity image is a two-dimensional image having the image ordinate V and the parallax Disparity as the axes, and indicates an image in which the histogram frequency of the data point is stored for each of the pixels.

The voting process starts from an initial state in which all the histogram frequencies of the respective pixels of the V-disparity image are zero, and counts up the histogram frequency of the pixel with which the spatial position of the data point is projected onto the V-disparity image, one by one, for each data point of the targets.

FIG. 4(b2) illustrates an example of the V-disparity image 115a to be output in the case of carrying out the voting process, and FIG. 4(b1) illustrates an example of the V-disparity image 115a to be output in a case where the data points of all the pixels of the parallax image 112a are voted without determining whether the data point is the road surface candidate in the voting process.

Incidentally, FIG. 4(b1) and FIG. 4(b2) visualize the V-disparity image using a white color in a case where the histogram frequency of the pixel is zero and a black color in a case where the histogram frequency of the pixel is high.

In FIG. 4(b1), the data points of the road surface 101 are reflected as a straight line 402 in an oblique direction, the data points of the preceding vehicle 102 are reflected as a straight line 403 in a V direction, and the data points of the tree 401 and other distant obstacles are reflected as a set 404 of straight lines in the V direction on the V-disparity image. The road surface detection unit 116 detects the presence and position of the road surface based on the histogram frequency value of the V-disparity image, and thus, it is difficult to accurately detect the road surface in a case where the straight line 403, the set 404, and the like, which are the projections of the obstacles other than the road surface, occupy the majority other than the projection 402 of the road surface, as illustrated in FIG. 4(b1).

To be more specific, the case where the accurate detection is difficult is a case where the obstacle area occupies the majority than the road area when seen in an image horizontal line as the large number of obstacles, for example, the preceding vehicles 102, are present in the proximity or the number of the obstacles is small but the obstacles are present in the close proximity, or a case where the obstacle such as the tree 401 is present at the distant place, although the number thereof is small, and the obstacle area occupies the majority than the road area when seen in an image horizontal direction.

However, the V-disparity image 115a output in the present embodiment is formed such that the histogram frequencies are high in a projection 402i of the road surface 102, and the histogram frequencies are low in a pixel position to which the obstacle that is not the road surface is projected while a most part of the obstacles that are not the road surface, for example, the front vehicle 102, the guardrail 103, the tree 401, and the like, are not determined as the road surface candidates and are not voted to the V-disparity image, as illustrated in FIG. 4 (b2), and thus, the road surface can be detected with greater accuracy than the prior art.

Next, a description will be given regarding the entire process flow of the processing configuration 106 according to the hardware with reference to FIGS. 5 to 6(b).

Figure 5:
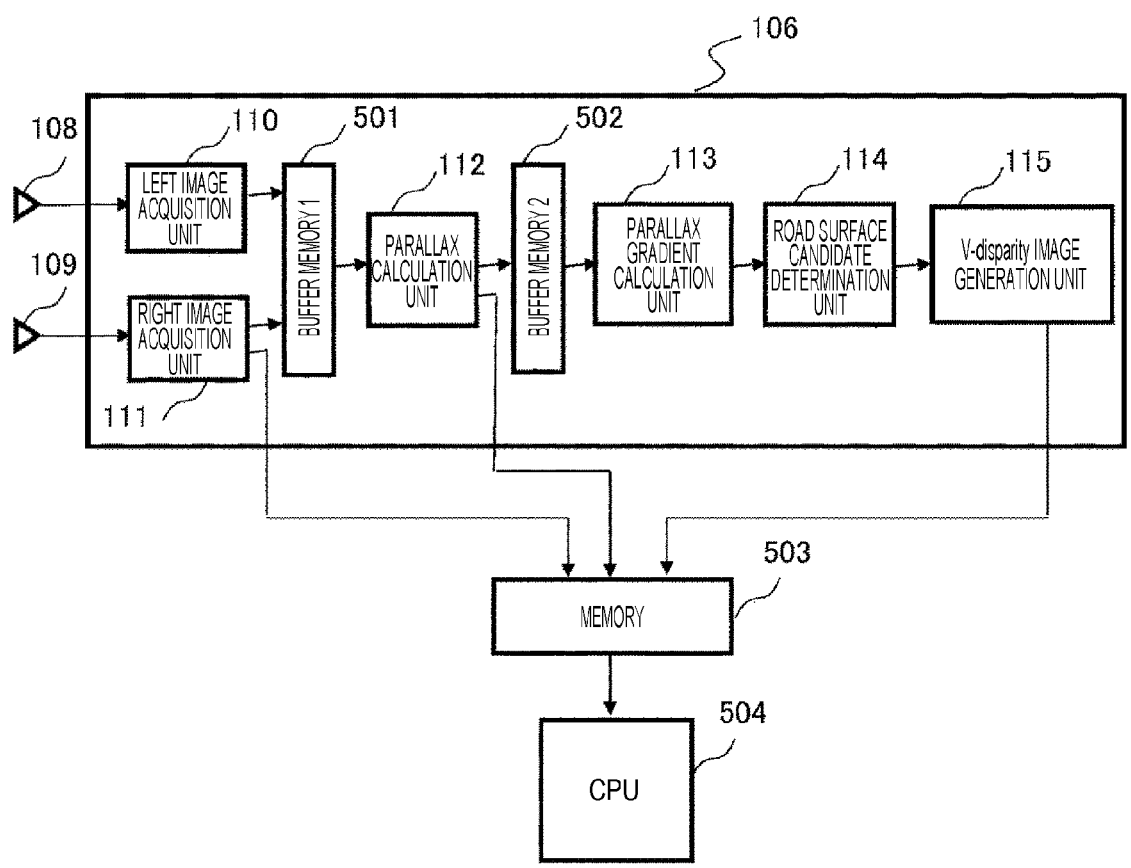
FIG. 5 is a block diagram illustrating a hardware processing configuration of the object detection device according to the present invention.

In FIG. 5, the left image acquisition unit 110 and the right image acquisition unit 111 start read of an image signal from the left imaging unit 108 and the right imaging unit 109 at a synchronized timing for each constant period, and transfer a signal of a luminance value for each pixel configuring the image to a buffer memory 501.

Figure 6A:
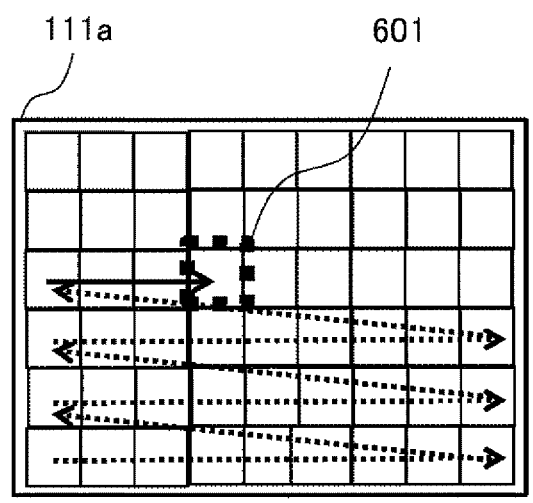
FIGS. 6A and 6B are diagrams that describe hardware processing configurations of the object detection device according to the present invention.

In addition, the right image acquisition unit 111 transfers the signal of each pixel also to a memory 503. The image signal is transferred in a direction from the left to the right with a lower end line of an image as a reference, as illustrated in FIG. 6(a), and, when the processing for an image signal of one line ends, an image signal of the upper line thereof is transferred in the same order.

Next, the parallax calculation unit 112 executes the parallax calculation processing in the same order as the transfer order of the right image acquisition unit 111 at a timing that is delayed by one line than the right image acquisition unit 111, and transfers the parallax data calculated for each pixel to a buffer memory 502 and the memory 503 in FIG. 5.

Next, the parallax gradient calculation unit 113 executes the parallax calculation processing in the same order as the transfer order of the parallax calculation unit 112 at a timing that is delayed by one line+one pixel than the parallax calculation unit 112, and calculates the parallax gradient data for each pixel in FIG. 5.

The V-disparity image generation unit 115 calculates a pixel position to be projected on the V-disparity space regarding the data point determined as the road surface candidate as described above, and counts up the histogram frequency at the pixel position of the V-disparity image stored in the memory 503 by one.

Next, when the processing for a single image frame, started at the above-described timing for each constant period is completed, a CPU 504 reads required data suitably from the memory 503, and executes the processes illustrated in the processing configuration 107 according to the software in FIG. 5.

Figure 6B:
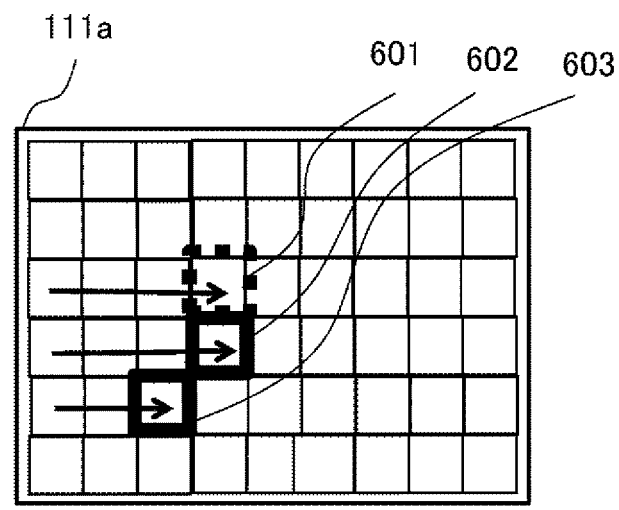

FIG. 6(b) illustrates a process timing of each unit by illustrating the pixel positions at which the right image acquisition unit 111, the parallax calculation unit 112, and the parallax gradient calculation unit 113 execute the processing at certain timings.

A pixel position 601 represents a position of a pixel processed by the right image acquisition unit 111, a pixel position 602 represents a position of a pixel processed by the parallax calculation unit 112, and a pixel position 603 represents a position of a pixel processed by the parallax gradient calculation unit 112. A reason why the parallax calculation unit 112 executes the processing at the timing delayed by one line than the right image acquisition unit 111 is that the signals of all pixel positions on the same line of the left image 110a need to have been stored in a buffer memory 1 in order to calculate the parallax in the pixel position 602 of the right image 111a, which requires the timing adjustment.

A reason why the parallax gradient calculation unit 113 executes the processing at the timing delayed by one line+one pixel than the parallax calculation unit 112 is that the signals of the pixel position 603 and the upper and lower pixel positions adjacent thereto need to have been stored in a buffer memory 2 in order to calculate the parallax gradient in the pixel position 603 of the right image 111a, which requires the timing adjustment.

In the above-described manner, the processing configuration 106 according to the hardware is processed at high speed in real time by carrying out pipeline processing in which the processes in the respective units are parallelized.

Next, a process in the road surface detection unit 116 will be described in detail with reference to FIG. 4(b2).

The road surface detection unit can detect the road surface by detecting a straight line or a curve based on the histogram frequency of the V-disparity image illustrated in FIG. 4(b2), and, for example, detects the straight line according to the method illustrated in PTL 1. The detected straight line can be expressed by the following Formula 1 on the V-disparity space.

[Formula 1]

$$dg = \alpha d \cdot (vg - v0) + \beta d \quad (1)$$

Here, dg represents the parallax of the road surface, vg represents the image ordinate of the road surface, v0 represents an image ordinate of a center position on the optical axis of the right image 111a, and αd and βd represent a gradient of the straight line and a section, respectively, on the V-disparity space having (V=v0, Disparity=0) as an origin point.

To detect the road surface means to calculate each of αd and βd of Formula 1, and the image ordinate vg, at which the road surface in the distance of the arbitrary parallax dg is imaged, can be calculated using Formula 1 when αd and βd are fixed. Further, Formula 2 relating to the triangulation will be shown as follows.

[Formula 2]

$$Y = -b \cdot (v - v0)/d \quad (2)$$

Here, Y represents a height on the real space of the data point having a position of the camera as an origin point, v represents an ordinate on the image to which the data point is projected, d represents the parallax of the data point, and b represents a baseline length, that is, a distance between the right and left cameras.

It is possible to calculate a road surface height Yg on the real space at which the road surface in the distance of the arbitrary parallax dg is imaged in the following Formula 3 using Formula 1 and Formula 2.

[Formula 3]

$$Yg = -b \cdot (dg - \beta d)/(\alpha d \cdot d) \quad (3)$$

The road surface detection unit 116 outputs a road surface height table in which the road surface height Yg is calculated for each parallax with a specified interval according to Formula 3 described above.

Next, a process in the obstacle candidate determination unit 117 will be described in detail.

The obstacle candidate determination unit 117 determines whether a data point of a pixel is an obstacle candidate by comparing a height Y on the real space of the data point of the pixel and the road surface height Yg on the real space corresponding to the distance of the data point of the pixel, which can be obtained by referring to the road surface height table output by the road surface detection unit 116, for each pixel of the parallax image 112a.

The determination criterion is whether the data point of the pixel is positioned on the road surface within a range in which the data point can be the obstacle without being a position floating in the air nor a position buried underground. To be specific, the determination criterion can be expressed by a determination formula like the following Table 2.

TABLE 2

| Yg − ΔYdown ≤ Y ≤ Yg + ΔYup | → Presence of obstacle candidate |
| otherwise | → Absence of obstacle candidate |

Here, ΔYup is set to a value corresponding to a height of a heavy truck from the road surface as a maximum height from the road surface at which the vehicle can be present, and ΔYdown is set to zero. The condition, "Y≤Yg+ΔYup" means a condition in which the data point of the pixel is present at a position lower than a height which is upper than the road surface by ΔYup, and the condition, "Yg−ΔYdown≤Y" means a condition in which the data point of the pixel is present at a position higher than the road surface.

In addition, although ΔYup and ΔYdown are set, respectively, to the above-described values in the present embodiment, the application to determine whether the data point of the pixel is an object candidate in the air such as a traffic light or a road sign in the air and detect an object in the air using the detection unit on the subsequent stage, for example, can be also made by adjusting ΔYup and ΔYdown.

Next, a process in the U-disparity image generation unit 118 will be described with reference to FIGS. 7 (a) and 7 (b).

FIG. 7 (a) illustrates the right image 109a, and it is configured such that the road surface 101, the preceding vehicle 102, and the guardrail 103 are reflected, as the main imaging targets, on the right image 109a. The U-disparity image generation unit 118 performs a process of histogram-voting of the data point, determined to be the obstacle candidate in the obstacle candidate determination unit 114 among the respective pixels of the parallax image 112a corresponding to the right image 109a, on the U-disparity image. Here, the U-disparity image is a two-dimensional image having an image abscissa U and the parallax Disparity as the axes, and indicates an image in which the histogram frequency of the data point is stored for each of the pixels. The voting process starts from an initial state in which all the histogram frequencies of the respective pixels of the U-disparity image are zero, and counts up the histogram frequency of the pixel with which the spatial position of the data point is projected onto the U-disparity image, one by one, for each data point of the targets.

FIG. 7 (b) illustrates an example of the U-disparity image 115a to be output in the case of carrying out the voting process.

Incidentally, FIG. 7 (b) visualizes the U-disparity image using a white color in a case where the histogram frequency of the pixel is zero and a black color in a case where the histogram frequency of the pixel is high. A data point of the front vehicle 102 is reflected as a straight line 801 in a U direction, and data points of the guardrail 103 are reflected as straight lines 802 and 803 in oblique directions on the U-disparity image.

Figure 7A:
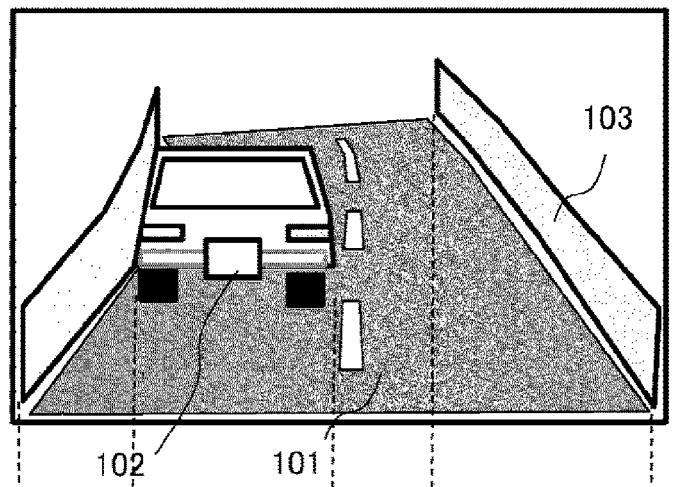
FIGS. 7A and 7B are diagrams that describe a process in a U-disparity image generation unit and an obstacle detection unit of the object detection device according to the present invention.

Next, a process in the obstacle detection unit 119 will be described in detail with reference to FIGS. 7(a) and 7(b).

Figure 7B:
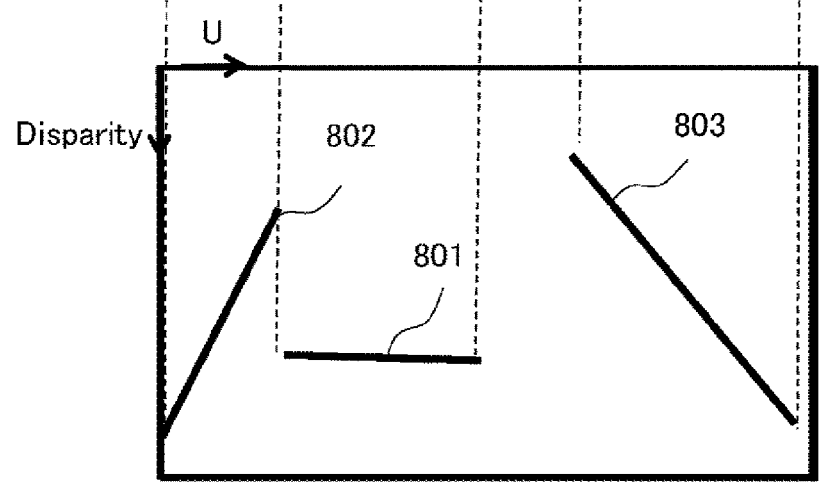

The obstacle detection unit 119 calculates the obstacle based on the histogram frequency of the U-disparity image illustrated in FIG. 7(b). To be specific, a process is performed in which a peak pixel having a maximum histogram frequency and the histogram frequency being higher than a threshold Hth is detected from one column by scanning pixels one by one from bottom to top in the left end column of the U-disparity image, the same process is performed by shifting one column by one column to the right side, and the process is repeated to the right end position of the image.

Further, when a difference between a position of each peak pixel for the image column and a position of a peak pixel in the left column thereof is smaller than a threshold DPth, the peak pixel and the peak pixel in the left column thereof are considered as object candidates which configure the same object, and a process is performed in which, when a length in the U direction of the object candidate is larger than a threshold Lth, the corresponding object candidate is detected as the object, and the peak pixels configuring the object candidate are associated with the same object ID.

If a description is given regarding a result of the above-described process by exemplifying a case where the U-disparity image illustrated in FIG. 7(b) is input, the object ID is associated with the object candidate such that, for example, the projection of 802 of a left guardrail has the object ID=1, the projection 801 of the front vehicle has the object ID=2, and the projection 803 of a right guardrail has the object ID=3, and the three objects are detected.

Next, a process in the parallax gradient threshold setting unit 120 will be described in detail.

The parallax gradient threshold setting unit 120 sets parallax gradient thresholds corresponding to respective parallax values that pixels of the parallax image 112a may have, and stores the parallax gradient thresholds in the memory as the parallax gradient threshold table 120a in order to determine whether a data point of a pixel of the parallax image 112a having certain parallax and parallax gradient is a road surface with a gradient that can be imaged by the stereo camera device 105. In a case where a maximum gradient of the road surface, that can be imaged by the stereo camera device 105, is set as $\alpha\max[rad]$ ($=\Delta Y//\Delta Z$: Y is a road surface height, and Z is a depth distance) on the real space, a value, obtained by calculating a parallax gradient $\alpha the (=\Delta Disparith/\Delta v)$ of a straight line which allows the road surface of the maximum gradient $\alpha\max$ to be projected on the V-disparity space, is set as the parallax gradient threshold.

A description will be given in detail with reference to Formulas to be applied in the present embodiment.

First, when a road surface having the road surface height Y=0 and a gradient of 0° at an arbitrary distance is defined as a standard road surface in a road surface coordinate system on the real space, a gradient $\alpha d0$ and a section $\beta d0$ of the straight line in which the standard road surface is projected on the V-disparity space are expressed by the following Formula 4.

[Formula 4]

$$\alpha d0 = b/(\beta 0 + h)$$

$$\beta d0 = -b \cdot fc \cdot \alpha 0/(\beta 0 + h) \quad (4)$$

Here, b represents the baseline length, h represents a mounting height of the camera, and fc represents a value obtained by dividing a focal length of the lens by a pixel pitch of the imaging element. Each of $\alpha 0$ and $\beta 0$ represents a gradient and a section of the standard road surface on the real space, and is set to zero in the above-described case where the road surface height Y=0 and the gradient is 0° at the arbitrary distance.

Next, a V coordinate position vg of the standard road surface of the data point of the pixel (which is set to have a parallax d and an image ordinate v) at the parallax d is calculated using the following Formula 5, and an approximate position (the parallax d, the image ordinate vg) of the pixel position when the data point of the pixel is projected on the V-disparity space is set.

[Formula 5]

$$vg = v0 + (d - \beta d0)/\alpha d0 \quad (5)$$

A reason of calculating the approximate position in the above-described formula is simply to allow the simplification of the calculation formula.

Next, a parallax gradient threshold $\alpha th$ in a case where the gradient of the road surface on the real space is the maximum gradient $\alpha\max$ in the above-described pixel position (the parallax d, the image ordinate vg) can be expressed using the following Formula 6.

[Formula 6]

$$\alpha th = -d/(v0 - vg + fc \cdot \alpha\max) \quad (6)$$

In the above-described manner, the parallax gradient threshold setting unit 120 calculates the parallax gradient threshold $\alpha th$ for each of parallax values d that the pixels of the parallax image 112a may have, and stores the calculated parallax gradient thresholds in the parallax gradient threshold table 120a.

As described above, the table is configured to be referred to by the road surface candidate determination unit 114 so as to determine whether the data point of the target pixel is the road surface candidate such that only the data point of the road surface candidate is subjected to the histogram voting in the V-disparity image generation unit 115 and the V-disparity image is generated.

Accordingly, the data point, considered not to be the road surface candidate is not voted to the histogram in the generated V-disparity image, and thus, the road surface is accurately detected in the case of detecting the road surface in the road surface detection unit 116 using the V-disparity image even if the area that is not the road surface, for example, the obstacle such as the vehicle, the pedestrian, or the guardrail occupies the majority on the image, and as a result, it is possible to accurately detect the obstacle on the road surface.

Further, it is possible to set a clear determination criterion whether to be regarded as the presence of the road surface candidate or the absence of the road surface candidate by changing the threshold of the maximum gradient of the road surface $\alpha\max$ that can be regarded as the road surface, and thus, it is possible to accurately detect the road surface by suitably setting the value of $\alpha\max$ even in a case where the gradient of the road surface is great or a case where the obstacle is not vertical but has a gradient with respect to the road surface.

Further, it is possible to optimally determine the road surface candidate in accordance with a scene, and more accurately detect the road surface by recognizing whether the vehicle is in the middle of driving on the ordinary road or driving on the highway and dynamically adjusting the maximum gradient $\alpha\max$ that the road surface may have.

The invention claimed is:

1. An object detection device comprising:
    a parallax calculation unit that generates a parallax image based on a plurality of images;
    a parallax gradient calculation unit that, for each pixel in the parallax image, calculates a parallax gradient for each pixel based on the parallax of a predetermined pixel and a pixel that is adjacent to the predetermined pixel;

a detection candidate determination unit that determines whether a detection candidate is present based on the parallax gradient of each pixel;

a voting unit that carries out a histogram vote using each of the pixels that are determined to be detection candidates and generates a histogram frequency for each of the pixels when the detection candidate is determined to be present; and an object detection unit that detects presence of an object and a position of the object based on the histogram frequency;

wherein the detection candidate determination unit compares the parallax gradient of the pixel and a parallax gradient threshold corresponding to the acquired parallax of the pixel for each pixel in the parallax image, and determines whether the detection candidate is present from each of the pixels;

wherein the parallax gradient calculation unit calculates and outputs the parallax gradient $\alpha i = \Delta Disparity/\Delta V$, where V is an image ordinate; and wherein the parallax gradient threshold is determined based on a maximum gradient of the road surface.

2. The object detection device according to claim 1, wherein the object to be detected by the object detection unit is a road surface or an obstacle.

3. The object detection device according to claim 1, wherein the detection candidate of the detection candidate determination unit is a road surface candidate, and the parallax gradient threshold is a threshold to determine whether the road surface is present for each parallax in a certain fixed range, and is stored in a parallax gradient threshold table in advance.

4. The object detection device according to claim 1, wherein the detection candidate determination unit determines whether a data point of each of the pixels, indicating a point on a three-dimensional space which is represented by an image coordinate of the pixel and the parallax stored in the pixel, is a road surface candidate.

5. The object detection device according to claim 1, wherein a V-disparity image is a two-dimensional image having an image coordinate in the vertical direction and parallax disparity as its axes, and the histogram vote counts up the histogram frequency of the pixel with which the spatial position of the data point is projected onto the V-disparity image, one by one, for each data point of target pixels.

6. The object detection device according to claim 1, wherein the parallax gradient calculation unit executes processing at a timing delayed by one line plus one pixel after the parallax calculation unit generates the parallax image.

7. The object detection device according to claim 1, wherein the application to determine whether a data point of the pixel is an object candidate in air including a traffic light or a road sign and detect an object in the air using the object detection unit on a subsequent stage is made by adjusting $\Delta Yup$ and $\Delta Ydown$, where Y represents a height of the data point having a position of a camera as an origin point.

8. A vehicle comprising:

the object detection device according to claim 1 which is provided with a traveling control unit that generates an instruction to control a braking force or a driving force based on the presence of the object and the position of the object which are detected by the object detection unit.

* * * * *